United States Patent
Hunter et al.

[15] 3,685,657
[45] Aug. 22, 1972

[54] FILTER UNDERDRAIN ASSEMBLY AND METHOD OF PRODUCING SAME

[72] Inventors: Bruce H. Hunter, 53 Oak Road, Long Meadow, Mass. 01106; Norbert L. Reiner, 21 Blakeslee Road, Wallingford, Conn. 06492

[22] Filed: March 16, 1971

[21] Appl. No.: 124,725

[52] U.S. Cl..............................210/289, 210/497
[51] Int. Cl. .............................................B01d 23/20
[58] Field of Search......210/279, 289, 323, 457, 497, 210/497.1

[56] References Cited

UNITED STATES PATENTS

| | | | |
|---|---|---|---|
| 2,819,800 | 1/1958 | Goodlow | 210/Goodloe |
| 3,327,864 | 6/1967 | Ball et al. | 210/497 X |
| 3,356,226 | 12/1967 | Miller, Jr. et al. | 210/497.1 X |
| 3,394,815 | 7/1968 | Harms et al. | 210/323 |

Primary Examiner—Samih N. Zaharna
Attorney—Peter L. Costas

[57] ABSTRACT

A filter underdrain assembly employs a perforated strainer body having a surface configuration providing circumferentially extending recesses. A fabric covering on the strainer body serves to separate particulate matter from the liquid passing therethrough, and plaiting of the fabric directly upon the surface of the strainer body results in interengagement therebetween. This reduces the normal tendency for relative axial movement to occur between the fabric covering and the body, particularly during backwashing operations.

9 Claims, 6 Drawing Figures

PATENTED AUG 22 1972

3,685,657

Inventors
Norbert L. Reiner
Bruce H. Hunter

By Peter L. Costas
Attorney

FILTER UNDERDRAIN ASSEMBLY AND METHOD OF PRODUCING SAME

BACKGROUND OF THE INVENTION

In filtration systems for cleaning the water of swimming pools and the like, it is common practice to employ a tank or other container filled with a particulate filtration medium. In certain cases, the apparatus previously employed has relied for filtration upon a layer of diatomaceous earth or similar fine particulate material deposited upon one or more appropriate members within the tank. However, the efficient use of such apparatus requires that the deposits be removed periodically from the support surfaces to prevent clogging and to ensure satisfactory filtration, and in many instances complete removal thereof has proven quite impracticable by convenient and conventional (i.e., backwashing) techniques. Other systems employed have relied upon a bed of sand, charcoal or other finely divided materials to provide the primary filtering effect, and such systems conventionally utilize a filter underdrain for the purpose of straining or separating the particulate filter medium from the liquid passing therethrough, so as to provide a purified filtrate, free of solid particles, for reuse.

Filter underdrains have previously been provided by a variety of different structures including devices fabricated of sandstone or other porous minerals, perforated stainless steel members, slotted pipes, and the like. However, serious difficulties have been experienced with underdrains of such types. The porous mineral structures tend to be very fragile and prone to breakage even in normal handling and use. Metallic members are relatively expensive, difficult to install satisfactorily, often quite inaccessible for cleaning and maintenance once in place, and also relatively weak as a result of the slotting or other modifications that are necessary to provide sufficient area for adequate filtration. Moreover, in substantially every type of underdrain previously available, the tendency for clogging has been relatively great, and dislodging of the particles to unclog the drain has typically been difficult, inefficient and/or detrimental to the device in some respect.

Accordingly, it is an object of the present invention to provide a novel and efficient filter underdrain assembly for use with a particulate filtration medium, which underdrain assembly has a high flow capacity and good straining characteristics, and in which any tendency for leakage and for bypass of the fabric by the particles of the filtration medium is minimized.

It is also an object of the invention to provide such an underdrain assembly that is durable, that is relatively facile and inexpensive to manufacture, and that enables rapid and convenient cleaning of the fabric to remove particulate matter which may become lodged therein.

Another object of the invention is to provide a novel method for the production of a filter underdrain assembly having the foregoing characteristics and advantages, which method is relatively facile and inexpensive to carry out.

SUMMARY OF THE INVENTION

It has now been found that the foregoing and related objects can be readily attained in a filter underdrain assembly comprising a tubular strainer body having a perforated sidewall with an exterior surface providing a multiplicity of circumferentially extending recessed portions therein. The strainer body has a fabric covering of filaments plaited directly upon its exterior surface and extending entirely thereabout over substantially the entire length thereof. The fabric covering conforms closely to the contour of the strainer surface so as to interengage with the strainer body in the recessed portions thereof and to resist the occurrence of relative axial movement therebetween. The assembly also includes means communicating with the interior of the body for connection to a pump, whereby particulate matter entrained in liquids passing into the interior of the strainer body through the fabric covering are removed thereby.

In the preferred embodiments of the invention the strainer body is generally cylindrical, with an outside diameter that alternates along the length thereof between a relatively large and a relatively small dimension; this provides a series of circumferential recesses extending entirely about the body. Most desirably, the connection means is positioned adjacent one end of the body and the assembly additionally includes an end plug inserted into the other end of the body and bonded to the inside surface of the sidewall to effect a seal thereat. To necessitate passage through the fabric covering of the entire volume of liquid entering into the body interior, the fabric covering extends about the body at least between the connection means and the plug bond area. Both the strainer body and the fabric covering may be fabricated of a synthetic resinous material to afford considerable advantages in accordance herewith and the material of the fabric is most desirably a polyester resin.

Certain objects of the invention may be attained in accordance with the method wherein a tubular strainer member is fabricated, having a perforated sidewall with an exterior surface providing a multiplicity of circumferentially extending recesses therealong. A fabric covering of filaments is plaited directly upon and in close conformity to the contour of the exterior surface, with the fabric covering extending entirely about the strainer member over substantially the entire length thereof. Means communicating with the interior of the strainer member for connection to a pump is provided, and the fabric covering is capable of effecting the removal of entrained particulate matter from liquids passing therethrough and through the sidewall of the strainer member into the interior thereof. Preferably, the method additionally includes the steps of applying a length of water impermeable material about the strainer member and fabric covering intermediate the ends thereof, and of severing the length of material, covering, and strainer member intermediate the ends in the production of a plurality of underdrain subassemblies. In such a method one of such communicating means is provided on each of the subassemblies to produce a strainer assembly therefrom. Most desirably, the method includes the steps of mounting connection means adjacent one end of the strainer member, and of sealing the other end of the strainer member by inserting an end plug thereinto and bonding the plug to the inside surface of the sidewall of the strainer member.

DETAILED DESCRIPTION OF THE ILLUSTRATED EMBODIMENTS

Figure 5:
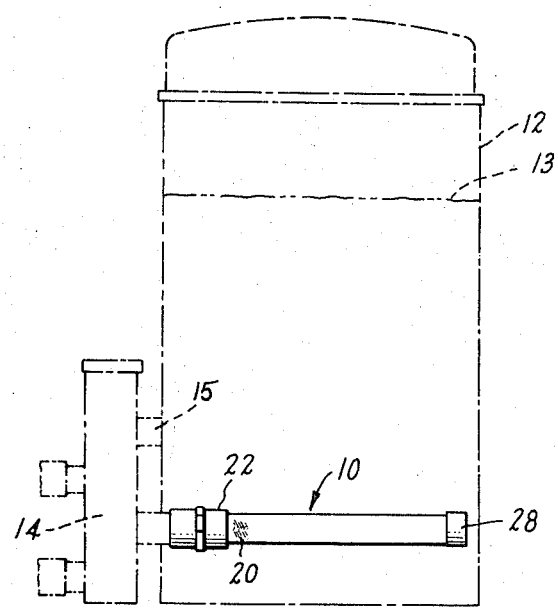
FIG. 5 is an elevational view drawn to a reduced scale and illustrating the filter underdrain assembly installed in a filtration tank that is fitted with a backwash valve, the tank and valve being shown in phantom line.
Figure 3:
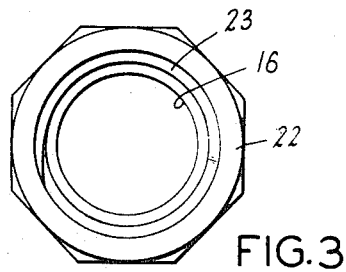
FIG. 3 is an end view thereof illustrating the female adapter thereof.
Figure 4:
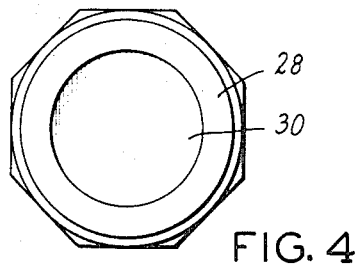
FIG. 4 is an opposite end view illustrating the end cap thereof.
Figure 1:
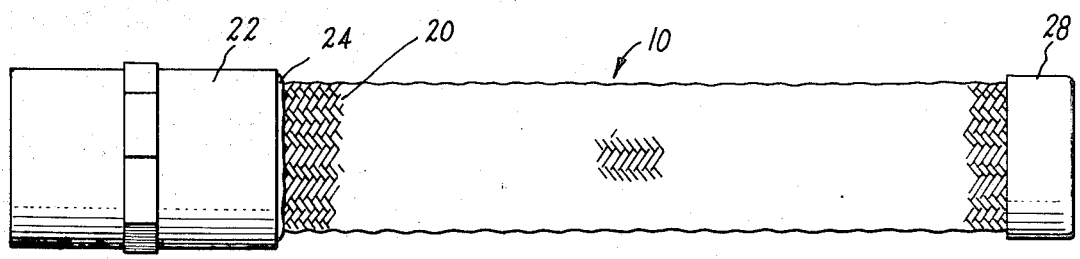
FIG. 1 is an elevational view of a filter underdrain assembly embodying the present invention.
Figure 2:
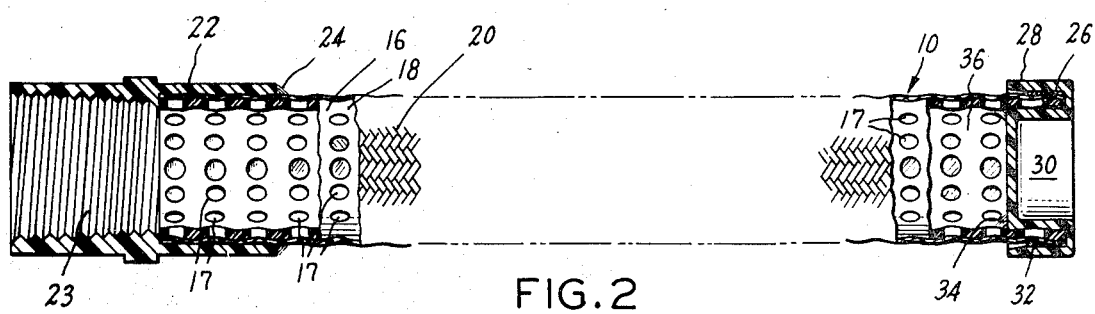
FIG. 2 is a sectional view of the assembly of FIG. 1.

Turning now in detail to FIGS. 1–5 of the appended drawing, therein illustrated is a filter underdrain assembly embodying the present invention and generally designated by the numeral 10. As is seen in FIG. 5, the assembly 10 is adapted for installation in a tank 12 containing sand or some other filtration medium 13, and the assembly 10 is attached to a backwash valve 14, the tank 12, sand 13 and valve 14 all being shown in phantom line. In one position of the valve 14, water is admitted into the tank 12, through conduit 15, passes through the medium 13 for filtration, and then exits through the underdrain 10, which separates entrained particles of the medium 13 and returns the water in a purified condition for reuse. In a second position of the valve 14, water passes into the tank 12 through the underdrain 10 to dislodge any particles of the filtration medium 13 that may have become lodged therein (the backwashing operation).

FIGS. 1–4 more clearly illustrate the construction of the underdrain assembly 10, which consists of a perforated elongated strainer tube 16 having an axially undulating outer surface 18 that is provided by circular portions that alternate along the length of the tube between a relatively large and a relatively small diameter to provide recesses in the reduced diameter portions. Plaited directly and snugly upon the outer surface 18 of the strainer tube 16 is a fabric covering 20, which closely follows the contours of the outer surface 18 and is thereby interengaged with the tube 16 to substantially prevent relative axial movement.

A female adapter 22 having an internally threaded portion 23 is secured over the fabric covering 20 and strainer tube 16 at one end thereof, and is bonded by adhesive 24 to form a seal therewith; normally, the adhesive will also extend under the adapter 22 to further enhance the seal and prevent leakage. A length of water-impermeable tape 26 is secured about the opposite end of the tube 16 and an end cap 28 having an axially extending circular recess or channel 32 in its inner end is assembled thereon, with the central plug portion 30 being inserted into the tube 16. The associated portion of the tube 16, fabric 20 and tape 26 seat within the recess 32 of the cap 28 between the plug portion 30 and outer lip portion. To ensure against leakage about the cap 26 (which might ultimately cause its disengagement), and adhesive material 34 is provided between the central plug portion 30 and the inside surface 36 of the tube 16; this bonded area serves to seal the end of the assembly 10 and to avoid entry of water between the mating surfaces of the tube 16 and cap 26.

Figure 6:
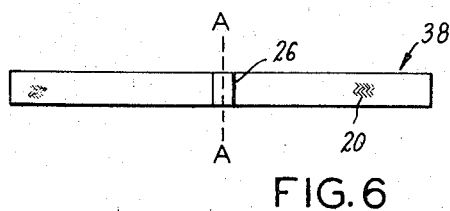
FIG. 6 is an elevational view drawn to a reduced scale and illustrating a double length strainer tube having a filter fabric covering plaited thereover, as used in the production of the illustrated underdrain assembly in accordance with the novel method hereof.

In accordance with a preferred method of producing the type of underdrain assembly herein disclosed, a double length of strainer tube (not visible) may be employed and plaited with fabric covering 20, as illustrated in FIG. 6. Tape 26 is secured in a double width intermediate the ends of the double tube to provide a subassembly 38, which may be severed along line A—A to provide the combination of strainer tube 16, fabric covering 20, and tape 26, upon which may be mounted the end members 22 and 26 to produce the underdrain assembly 10 of FIGS. 1–5.

The materials utilized in the manufacture of the underdrain assembly disclosed herein may vary considerably and will be quite apparent to those skilled in the art. Normally, a synthetic resinous material of either thermoplastic or thermosetting nature will be employed for the body of the assembly due to the facility and economy with which such materials may be fabricated into the desired configuration, and also due to the resistance to wear and deterioration which such resins afford. Although a considerable number of different types of synthetic resins might be appropriate, the polyolefines such as polyethylene and polypropylene have been found to serve admirably because of their inert characteristics, facile forming characteristics and relatively low cost.

The material utilized as the fabric sleeve upon the body is also desirably provided by a synthetic resin, and a wide variety of appropriate polymers are available. However, it has been found that fabrics produced from polyester fibers, such as polyethylene terephthalate, provide good filtration characteristics, while at the same time offering very desirable flow rates and a level of strength that results in a long useful life for the assembly. Certain synthetic fabrics, such as those fabricated of nylon filaments, are somewhat less desirable since they have a tendency to swell in water, which is generally absent in the polyester-type fabrics.

The end members and adapters used in the underdrain will normally be fabricated of synthetic resinous materials, the choice of which will depend somewhat upon the materials used for the body and fabric covering. Although common masking tape (desirably coated with a water-proof adhesive) may be employed to secure the ends of the fabric during assembly operations, a vinyl tape is more appropriately used to provide a higher degree of protection against leakage. It is important that, when such a tape element is utilized, it not be of a water-permeable material since water seeping under the end members would tend to loosen the member and promote its disengagement. Of course, all adhesives employed should be of a waterproof type.

In use, it has been found that the underdrain assembly herein described offers more efficient filtration than do comparable prior art devices, and considerably higher rates of flow. In some instances, tests have shown that as much as 50 percent more water can be filtered, per unit of time, utilizing an underdrain assembly constructed in accordance with the invention as compared with underdrains of the prior art.

In terms of durability, an underdrain assembly of the present type (utilizing a polyolefin body with polyester fabric covering plaited thereon) has exhibited a useful life greatly in excess of any comparable device or assembly heretofore known. Tests were performed utilizing such an underdrain assembly in a simulated installation, and a cycle wherein water was drawn through the underdrain for four minutes followed by a backwashing operation effected for 1 minute. The underdrain was subjected to 900 cycles without any evidence of lessened effectiveness of damage to any part of the assembly. In a typical swimming pool installation, the underdrain would be subjected to approximately 40 backwash cycles per year, indicating that its useful life may often exceed that of the filter or of the swimming pool itself.

Thus, it can be seen that the present invention provides a novel and efficient filter underdrain assembly for use with a particulate filtration medium, which assembly has a high flow capacity and good straining characteristics and which minimizes any tendency for leakage and for bypass of the fabric by the particles of the filtration medium. The invention provides a durable assembly that is relatively facile and inexpensive to manufacture and in which the fabric may be rapidly and conveniently cleaned to remove particles which may become lodged therein. The method utilized to produce underdrain assemblies having the foregoing characteristics and advantages is novel and is relatively facile and inexpensive to carry out.

Having thus described the invention, we claim:

1. A filter underdrain assembly comprising a tubular strainer body having a perforated sidewall with an exterior surface providing a multiplicity of circumferentially extending recessed portions therein; a fabric covering of filaments plaited directly upon said exterior surface and extending entirely about said strainer body over substantially the entire length thereof, said fabric covering conforming closely to the contour of said strainer surface to interengage with said body in said recessed portions and to resist relative axial movement between said covering and said body; and means communicating with the interior of said body for connection to a pump, said fabric covering effecting the removal of entrained particulate matter from liquids passing through said covering and said sidewall of said body into the interior thereof.

2. The assembly of claim 1 wherein said body is generally cylindrical with an outside diameter that alternates along the length thereof between a relatively large and a relatively small diameter, to provide a series of circumferential recesses therein extending entirely about said body.

3. The assembly of claim 2 wherein said connection means is adjacent one end of said body and wherein said assembly additionally includes an end plug inserted into the other end of said body and bonded to the inside surface of said sidewall to seal said other end of said body, said fabric covering extending about said body at least between said connection means and the area of bond with said plug to necessitate passage through said fabric covering of the entire volume of liquid entering into the interior of said body.

4. The assembly of claim 1 wherein said body and said fabric covering are each fabricated of synthetic resinous materials.

5. The assembly of claim 1 wherein the synthetic resinous material of said fabric is a polyester.

6. In a method for producing a filter underdrain assembly, the steps comprising:
   a. fabricating a tubular strainer member having a perforated sidewall with an exterior surface providing a multiplicity of circumferentially extending recesses therealong;
   b. plaiting a fabric covering of filaments directly upon and in close conformity to the contour of said exterior surface with said fabric covering extending entirely about said strainer member over substantially the entire length thereof, said close conformity causing interengagement of said fabric covering with said strainer member in said circumferential recesses to resist relative axial movement therebetween; and
   c. providing on said strainer member means communicating with the interior thereof for connection to a pump, said fabric covering being capable of effecting the removal of entrained particulate matter from liquids passing through said fabric covering and said sidewall of said strainer member into the interior thereof.

7. The method of claim 6 wherein said strainer member is provided in said fabricating step with an outside diameter that alternates along the length thereof between a relatively large and a relatively small diameter to provide a series of circumferential recesses extending entirely about said body, said fabricating step additionally involving extrusion of a synthetic resinous material through a generally annular die opening to produce a generally cylindrical strainer member.

8. The method of claim 6 wherein said strainer member and covering are relatively long, and additionally including the steps of applying a length of water-impermeable material about said strainer member and said fabric covering intermediate the ends thereof, severing said length of material, fabric covering and strainer member intermediate said ends to produce a plurality of underdrain subassemblies, and of providing one of said communicating means on each of said subassemblies to produce a strainer assembly therefrom.

9. The method of claim 7 wherein there are included the additional steps of mounting connection means adjacent one end of said strainer member and of sealing the other end of said strainer member by inserting an end plug thereinto and bonding said plug to said inside surface of said sidewall of said strainer member.

* * * * *